May 13, 1930.                L. SAIVES                1,758,806
                    STEERING OF ENDLESS TRACK VEHICLES
                         Filed Nov. 8, 1926         2 Sheets-Sheet 1
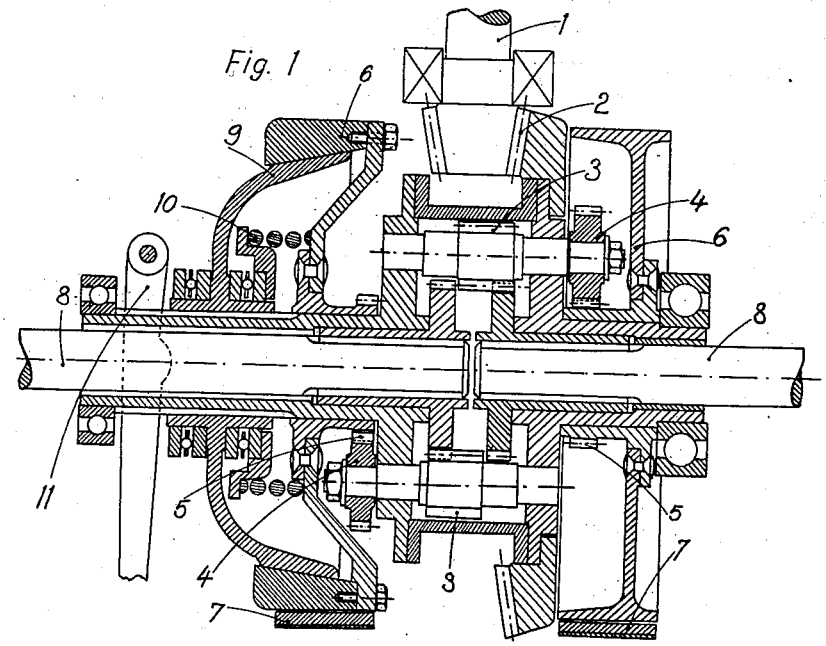
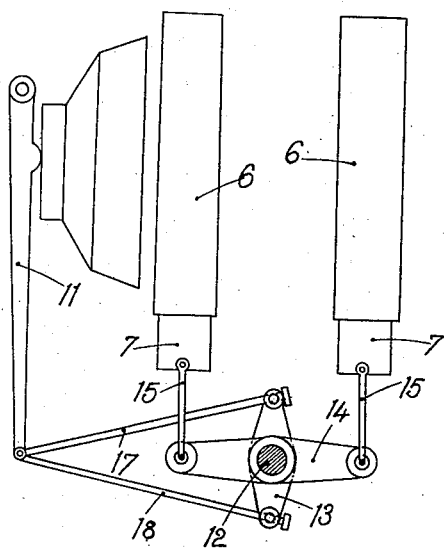
INVENTOR
LÉON SAIVES,
By O'Neill & Bunn
         ATTORNEYS.

May 13, 1930.  L. SAIVES  1,758,806
STEERING OF ENDLESS TRACK VEHICLES
Filed Nov. 8, 1926   2 Sheets-Sheet 2
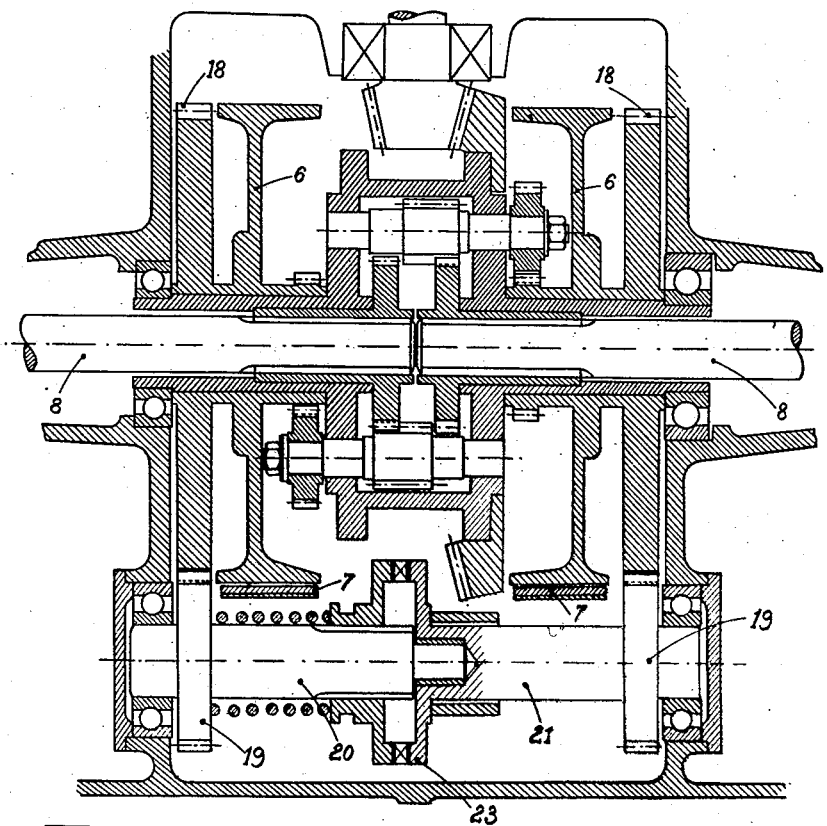
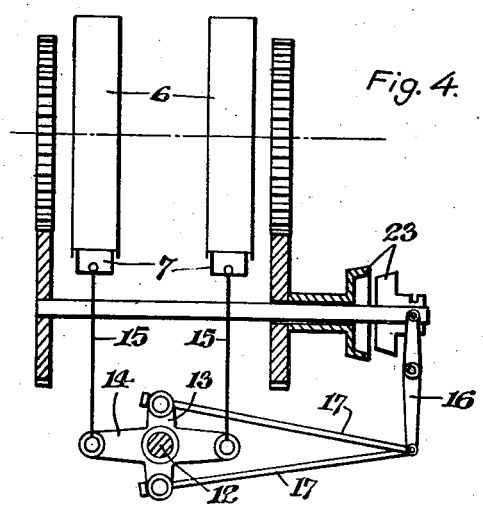
INVENTOR
LÉON SAIVES,
By O'Neill & Bunn
ATTORNEYS.

Patented May 13, 1930

1,758,806

UNITED STATES PATENT OFFICE

LEON SAIVES, OF BILLANCOURT, FRANCE, ASSIGNOR TO SOCIÉTÉ ANONYME DES USINES RENAULT, OF BILLANCOURT, FRANCE, A CORPORATION OF FRANCE

STEERING OF ENDLESS-TRACK VEHICLES

Application filed November 8, 1926, Serial No. 147,015, and in France December 11, 1925.

The invention relates to endless track vehicles comprising a steering control of the type described in the specification of U. S. Patent No. 1,253,319, issued Jan. 15, 1918. In that arrangement the steering of the vehicle is obtained by the change of speed of the wheels driving the endless track, one of the wheels at the instant of turning having a speed greater by a certain amount than that of normal running in a straight line whilst the other wheel has a speed less by the same amount than that of normal running.

In the apparatus according to the above-mentioned specification it is necessary in order to obtain running in a straight line to act continuously on the controls, which demands continuous attention on the part of the driver.

The improvements which are the subject of the present invention allow of avoiding this drawback and consist in attaching to one another the two shafts of the differential gear driving the endless chains by means within reach of the driver and which will be hereinafter more particularly described.

In the accompanying drawing Fig. 1 is a section of the differential mechanism driving the shafts operating the endless tracks in a vehicle provided with the improvements which are the subject of the invention.

Fig. 2 is a diagrammatic view showing the arrangement of the controls.

Fig. 3 shows a section of a modification of the construction of the driving arrangement of the endless tracks.

Fig. 4 is a diagrammatic view of the controls relating to the arrangement of Fig. 3.

By referring to the drawing it is seen that the driving shaft is shown at 1. This shaft operates in the ordinary way by means of conical gear 2 a differential mechanism, the satellite pinions 3 of which have pinions 4 outside the casing meshing with toothed wheels 5 keyed on drums 6, to which can be applied brake bands 7.

In order to obtain running in a straight line the two shafts 8 operated by the differential gear and driving the endless track have to be attached to each other.

For this purpose one of the brake drums 6 constitutes one member of a clutch, the other member 9 of which can slide on the casing of the differential gear whilst remaining subject to the rotation of this latter.

A spring 10 tends to hold the two members of the clutch in contact, the control of the clutch being effected by means of a lever 11. It is seen at once that when the two members of the clutch are in contact the whole mechanism of the differential gear is locked together with the pinions which depend on it. The two shafts 8 operating the endless tracks are then attached to each other.

To ensure the security indispensable for good working of the apparatus it is necessary that the controls be arranged in such way that when slewing, that is to say, when the brake bands 7 are operated, the coupling 6—9 must be declutched.

There is provided for this purpose a control (Fig. 2) comprising a shaft 12 carrying two small plates 13, 14 arranged at right angles, which are connected respectively to the brake bands 7 by rods 15 and to the lever 11 operating the clutch 6—9 by rods 17. When the clutch is applied, both brakes are automatically released by means of the device shown in Figure 2, in which operation it is not necessary that one of the rods 17, 18 be drawn to the right, and, since the plate 13 must have the position which is shown, both rods 15 are in the position of release. On the contrary, when plates 13 and 14 are rotated, one of the rods 17 or 18 is drawn to the right, and in moving the rod 11 to the right, the clutch is released; simultaneously power is applied to one of the rods 15, and the corresponding brake is applied.

In the modification shown in Figs. 3 and 4 the brake bands of the system of the aforesaid U. S. patent are shown at 7 and the drums 6 are attached to the toothed wheels 18, which mesh with wheels 19 keyed respectively on shafts 20, 21 located in one and the same straight line and which can be coupled together by means of a suitable clutch 23.

It is seen at once that when the clutch 23 is operative the differential mechanism is blocked and the shafts 8 which drive the endless tracks, attached to each other, rotate at the same speed. There is shown in Fig. 4 a system of control by which, in order to avoid all accidents or breaking of the mechanism, the brake controls of the drums 6 and of the clutch 23 are interconnected. This system comprises, as in the previous construction described with reference to Fig. 2, a shaft 12 carrying two small plates 13 and 14 connected by a system of rods 15 and 17 with the brake bands and with the clutch 23.

Claims:

1. In a steering control for endless track vehicles, separate drive shafts for each track, differential gearing for actuating each shaft including braking means for the respective sections of the differential, a clutch for effecting locking of the differential sections and the drive shafts together for driving in a straight line, and interconnected means for releasing the clutch when either brake is applied and for releasing the brakes when the clutch is applied.

2. In a steering control for endless track vehicles, separate drive shafts for each track, differential gearing for actuating each shaft including drum and band brakes for the respective sections of the differential, a clutch for effecting locking of the differential sections and the drive shafts together for driving in a straight line, and interconnected controls for each brake and the clutch to release the clutch when either brake is applied and for releasing the brakes when the clutch is applied.

3. In a steering control for endless track vehicles, separate drive shafts for each track, differential gearing for actuating each shaft including drum and band brakes for the respective sections of the differential, a clutch for effecting locking of the differential sections and the drive shafts together for driving in a straight line, and interconnected lever mechanism for each brake and the clutch to release the clutch when either brake is applied and for releasing the brakes when the clutch is applied.

In testimony whereof I affix my signature.

LEON SAIVES.